(12) United States Patent
Stockmaster

(10) Patent No.: US 6,999,027 B1
(45) Date of Patent: Feb. 14, 2006

(54) ACCOMMODATION OF ANTI-JAMMING DELAYS IN GNSS RECEIVERS

(75) Inventor: Michael H. Stockmaster, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 231 days.

(21) Appl. No.: 10/628,161

(22) Filed: Jul. 28, 2003

(51) Int. Cl.
*H04B 7/185* (2006.01)

(52) U.S. Cl. ............................... 342/357.02; 342/357.06

(58) Field of Classification Search .......... 342/357.02, 342/357.03, 357.06, 357.12, 16; 701/207, 701/213, 215
See application file for complete search history.

(56) References Cited

U.S. PATENT DOCUMENTS

| | | | |
|---|---|---|---|
| 4,894,662 A * | 1/1990 | Counselman | 342/357.12 |
| 5,828,336 A * | 10/1998 | Yunck et al. | 342/357.02 |
| 5,952,968 A | 9/1999 | McDowell | 342/383 |
| 5,990,831 A | 11/1999 | McDowell | 342/378 |
| 6,397,147 B1 * | 5/2002 | Whitehead | 701/213 |
| 6,407,700 B1 * | 6/2002 | Giffard | 342/357.12 |
| 6,421,000 B1 | 7/2002 | McDowell | 342/357.06 |
| 6,469,663 B1 * | 10/2002 | Whitehead et al. | 342/357.03 |
| 2004/0135721 A1 * | 7/2004 | Hoven et al. | 342/357.02 |
| 2004/0145517 A1 * | 7/2004 | Kinal et al. | 342/357.02 |

* cited by examiner

*Primary Examiner*—Dao Phan
(74) *Attorney, Agent, or Firm*—Nathan O. Jensen; Kyla Eppele

(57) ABSTRACT

Delays associated with anti-jamming systems utilized in GPS systems can be determined to reduce pseudo range errors. The pseudo range errors are corrected so that proper ionospheric corrections can be made. An extrapolation method can be utilized to improve ionospheric corrections.

20 Claims, 2 Drawing Sheets

ACCOMMODATION OF ANTI-JAMMING DELAYS IN GNSS RECEIVERS

FIELD OF THE INVENTION

The present invention relates generally to signal error reduction in positioning systems, such as, the global positioning system (GPS), global navigation satellite system (GLONASS), terrestrial or aircraft-based pseudolites, and the like. More particularly, the present invention relates to a method of and system for mitigating errors due to anti-jamming circuits used in receivers in positioning systems.

BACKGROUND OF THE INVENTION

Global position systems, such as the American NAVSTAR GPS and Russian GLONASS, are known. The NAVSTAR GPS developed by the U.S. Department of Defense is a satellite-based radio navigation system which transmits information from which extremely accurate navigational calculations can be made in three-dimensional space anywhere on or near the Earth. Three-dimensional velocity can be determined with similar precision. The GPS uses eighteen to twenty-four satellites that may, for example, be evenly dispersed in three, inclined, twelve hour circular orbits chosen to ensure continuous twenty-four hour coverage world-wide. Each satellite uses extremely accurate cesium and rubidium vapor atomic clocks for generating a time base. Each satellite is provided with clock correction and orbit information by Earth-based monitoring stations.

Each satellite transmits a pair of L-band signals. The pair of signals includes an L1 signal at a frequency of 1575.42 MHz and L2 signal at a frequency of 1227.6 MHz. The L1 and L2 signals are bi-phase signals modulated by pseudo-random noise (PRN) codes and an information signal (i.e., navigation data) encoded at 50 Hz. The PRN codes facilitate multiple access through the use of a different PRN code by each satellite.

Upon detecting and synchronizing with a PRN code, a receiver decodes the PRN encoded signal to recover the navigation data, including ephemeris data. The ephemeris data is used in conjunction with a set of Keplerian equations to precisely determine the location of each satellite. The receiver measures a phase difference (i.e., time of arrival) of signals from at least four satellites. The time differences are used to solve a matrix of four equations. The result is a precise determination of the location of the receiver may be determined by a precise measurement of the L1 and L2 frequencies. The measure frequencies are used to determine Doppler frequency shifts caused by differences in velocity. The measure differences are used to solve another set of equations to determine the velocity based upon the Doppler phase shift of the received signal. U.S. Pat. Nos. 6,421,000, 5,990,831 and 5,952,968 by McDowell and assigned to the assignee of the present application describe receivers used in positioning systems.

GPS signals are very low in amplitude and are transmitted using a spread-spectrum signal bandwidth centered at 1575.42 and 1227.6 MHz. The GPS signals cover a frequency spread of about 20 MHz. GPS receivers are subject to disruption by jamming signals, which may be transmitted either as narrow band signals or broadband signals. Known GPS receiver systems may reduce the effects of a narrow band jamming by using frequency-selective filters, such as notch filters, to attenuate the jamming signal. However, broad band jamming signals are more difficult to reduce or eliminate (to "null-out") as the frequency spread of the jamming signals approximates the frequency spread of the GPS signal. However, because the frequency spreading sequence of the GPS signal is encrypted according to a pseudo-random noise code, the jamming signals cannot be precisely synchronized to the GPS signal. This permits the effects of the jamming signal to be reduced by nulling-out the jamming signal. Further, the signal strength of the jamming signal is typically much greater than the signal strength of the GPS signal and allows the jamming signal to be nulled down to the thermal noise floor.

As described in U.S. Pat. Nos. 5,952,968, and 5,990,831, conventional positioning receivers have utilized anti-jamming circuitry or processing to reduce susceptibility to inaccuracies and poor tracking due to jamming signals. Conventional systems can utilize space time adaptive processing (STAP) and space frequency adaptive processing (SFAP) to reduce errors due to jamming signals. However, under certain conditions, STAP and SFAP processing can impart geometrically dependent delays on the received GPS signals. The geometrically dependent delays can manifest themselves as pseudo range errors. Although a beamformer can correct for these delays, conventional beamformer techniques generally require twelve additional equalizing filters in addition to the four beam outputs. Future systems that require GPS signals from more satellites than conventional systems may require at least twenty four additional equalizing filters. Additional equalizing circuits require additional processing power and additional hardware.

Generally, receivers perform an ionospheric correction calculation to adjust GPS calculations for delays associated with the GPS signals penetrating the ionosphere. One known equation for the ionospheric correction is:

$$(\rho_{L2} - \rho_{L1})/1-\beta)$$

where $\beta=(154/120)^2$ for L2 correction and $\beta=(120/154)^2$ for L2 correction; $\rho_{L2}$=the uncorrected pseudo range for L2 and $\rho_{L1}$ is the uncorrected pseudo range for L1.

If uncorrected pseudo range values are used in ionospheric corrections, a significant error can be imparted by the STAP/SFAP processing circuit. For example, anti-jamming induced errors or delays can be quadrupled during ionospheric corrections.

In conventional anti-jamming GPS receiver systems, ionospheric correction measurements are not calculated once anti-jamming processing begins due to the single frequency nature of the anti-jamming process. Current accuracy requirements for such systems do not require ionospheric corrections (iono processing) in the anti-jamming mode. However, the natural progression towards tighter accuracy requirements forces ionospheric correction measurements to be made when anti-jamming is enabled. For example, GPS anti-jamming systems are proposed with a snapshot iono feature in which measurements are made on the current tracking frequency with anti-jamming processing enabled, then on the opposite frequency with the anti-jamming processing enabled. The snapshot iono feature enables ionospheric corrections to be calculated when one or both of the two frequencies (L1 or L2 signals) are jammed, which has the potential to offer improved ionospheric correction performance in a jammed environment.

However, since anti-jamming processing is required to track the signal on at least one of two frequencies, the antenna pattern generated by the anti-jamming algorithm (e.g., the STAP algorithm) has the potential to introduce large delays on one or both frequencies upon which a satellite can be tracked. The potential for large delays is especially pronounced for satellites that do not receive the benefit of beam steering. As a result, the following problems can exist:

(1) In the case of jamming on only one frequency, any bias that exists on the jammed frequency can be scaled by −1.54 for L1 corrections and 2.54 for L2 corrections. This implies that for pseudo range bias of X meters, the ionospheric correction error is −1.54X for L1 and 2.54X for L2 and that the total (regular pseudo range plus ionospheric correction) bias after ionospheric corrections are applied, is either −0.54X or 3.54X depending on frequency if the beamformer corrections have already been applied to the pseudo range. This error can be quite large when jamming is present on L1 only and the receiver is tracking without the assistance of anti-jamming processing on L2.

(2) For the case of jamming on both frequencies, the difference in biases gets scaled into the ionospheric correction. For an L1 bias of X meters and L2 bias of Y meters, an L1 pseudo range error of X+1.54(Y−X) or 1.54Y−0.54X and an L2 pseudo range error of Y+2.54(Y−X) or 3.54Y−2.54X are implied. Depending on the sign of each error, the pseudo range error can be very significant. If all L1 and L2 are jammers are co-located, any bias would likely be similar and the error in the ionospheric correction would essentially cancel. If the L1 and L2 jammers are not co-located and biases exist, the error does not cancel out in the ionospheric corrections.

(3) When the receiver transitions from the tracking frequency to the alternate frequency to make the snapshot iono correction, the antenna may be undergoing dynamics such that the antenna pattern is changing rapidly. The fast change relative to the delay in making the alternative frequency measurements can cause compensation from the beamformer to become stale. The antenna pattern can change due to the jammer dynamics as well.

Accordingly, there is a need to adjust for delays associated with anti-jamming circuitry before ionospheric corrections are made. Further, there is a need for an ionospheric correction technique that utilizes extrapolation to improve ionospheric corrections in anti-jam systems. Further, there is a need for a method of removing STAP and SFAP induced errors for ionospheric corrections without the hardware complexity, and software complexity associated with conventional beamformer techniques. Yet further, there is a need for a system and method of reducing anti-jamming induced errors in positioning systems. Yet further, there is a need to reduce anti-jamming errors without requiring equalizing filters for each GPS signal.

SUMMARY OF THE INVENTION

An exemplary embodiment relates to a method of compensating for delays induced by anti-jamming processing. The method includes determining a delay associated with the anti-jamming processing, and adjusting ionospheric corrections in response to the delay.

Another exemplary embodiment relates to a positioning system. The positioning system includes an anti-jamming processing circuit. The positioning system also includes a distortion calculator and an ionospheric correction circuit. The distortion calculator calculates a delay associated with the digital anti-jamming processing circuit. The ionospheric correction circuit provides ionospheric corrections for pseudo range values derived from data provided by the digital anti-jamming processing circuit. The ionospheric correction circuit calculates the ionospheric corrections in response to the delay to reduce errors induced from the digital anti-jamming processing circuit.

Another exemplary embodiment relates to an apparatus for removing anti-jamming induced errors from ionospheric corrections. The apparatus includes means for determining a delay associated with the anti-jamming processing and means for calculating ionospheric corrections. The means for calculating ionospheric corrections either receives pseudo range values adjusted by the delay or calculates the ionospheric corrections in accordance with the delay.

BRIEF DESCRIPTION OF THE DRAWINGS

Exemplary embodiments will become more fully understood from the following detailed description, taken in conjunction with the accompanying drawings, wherein like numerals denote like parts, and wherein.

DETAILED DESCRIPTION OF PREFERRED EXEMPLARY EMBODIMENT

Figure 1:
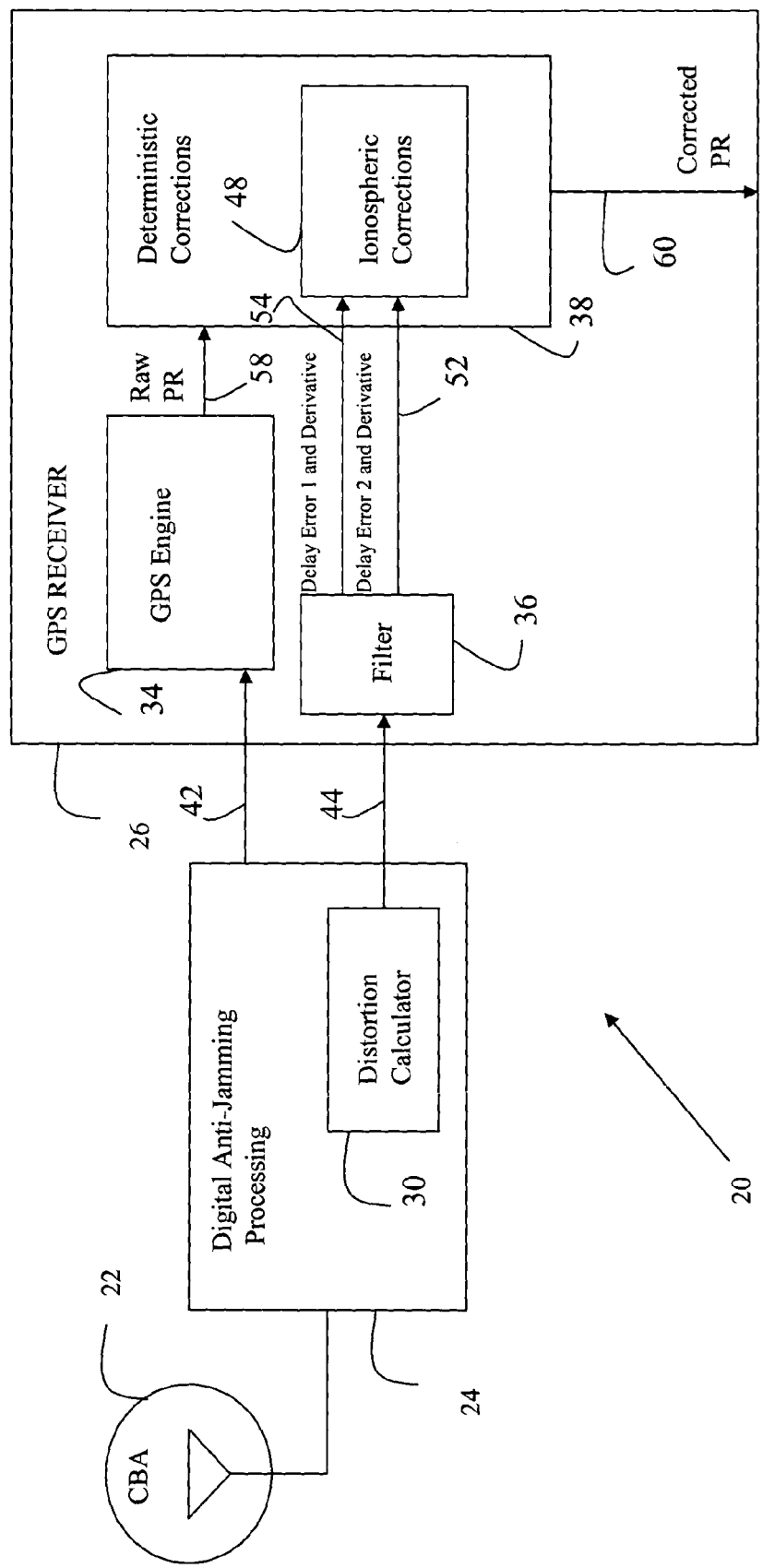
FIG. 1 is a general block diagram of a GPS receiver utilizing ionospheric correction calculations and including an anti-jamming circuit in accordance with an exemplary embodiment.

With reference to FIG. 1, a GPS receiver 20 includes a GPS receiver analog front end 22, a digital anti-jamming processing circuit 24, and a positioning receiver 26. Preferably system 20 is configured for use in a global positioning system (GPS) and is described as such below. However, system 20 can be configured to operate in any type of positioning system including a GLONASS system, a pseudolite system, or other positioning system without departing from the present invention.

Analog front end 22 can include any number of known processors and circuits for providing a digital signal to digital anti-jamming process circuit 24. Analog front end 22 can include well-known analog circuitry including a multiple element antenna array, radio frequency conversion circuits, analog-to-digital converters, I/Q base band converters, etc. Analog front end 22 can be the same type of analog front end used in conventional GPS receivers such as those manufactured by Rockwell Collins, Inc., the assignee of the present invention.

Analog front end 22 provides digital signals to digital anti-jamming circuit 24. The digital signals are representative of the GPS signals provided by a number of satellites (e.g., L1 and L2 signals). The digital signals are processed to compensate for jamming effects by digital anti-jamming circuit 24 and provided via conductor 42 to positioning receiver 26. Positioning receiver 26 processes the data at conductor 42 to generate corrected pseudo range values at output 60. Digital anti-jamming processing circuit 24 also provides distortion parameters across conductor 44 to assist the calculation of corrected pseudo range values.

In one embodiment, conductor 42 provides digital data in parallel to positioning receiver 26 and conductor 44 provides serial data to positioning receiver 26. Conductor 42 can be a highway of digital data. Alternatively, other data formats are possible for communicating data between circuit 24 and receiver 26.

Digital-antijamming processing circuit 24 and positioning receiver 26 can be conventional circuits modified in accordance with the present invention. The modifications preferably reduce errors due to anti-jamming in the corrected pseudo range values. Digital anti-jamming processing circuit 24 can be a circuit similar to that utilized in conventional GPS receivers manufactured by Rockwell Collins, such as the DAGR anti-jam accessory, modified to provide an indication of delay or distortion associated with circuit 24. Positioning receiver 26 can also be similar to positioning receivers utilized in GPS receivers manufactured by Rockwell Collins, Inc. such as the NavStrike™ Digital (NSD) and Defense Advanced GPS Receiver (DAGR), modified to adjust the ionospheric calculation or data used in the ionospheric calculation to accommodate the distortion or delay associated with circuit 24. The location of the modified components for accommodating antijamming errors are not disclosed in a limiting fashion. The modifications can be located or integrated with various components in receiver 20.

Digital anti-jamming processing circuit 24 preferably includes a distortion calculator 30 that calculates the delay associated with the anti-jamming processing performed by circuit 24. Preferably, the delay is provided as a parameter relating the amount of delay at reference to a particular time (e.g. a message or number giving a delay of Y at a time of X). Delay is determined in general by calculating the effective anti-jam filter response (group delay) in the direction of the desired signals.

Positioning receiver circuit 26 includes a GPS engine 34, a filter 36 and a deterministic corrections circuit 38. GPS engine 34 receives the digital data associated with the GPS satellite signals corrected for jamming at conductor 42. GPS engine 34 processes the signals and provides raw pseudo range values at output 58. The raw pseudo range values at output 58 are provided to deterministic corrections circuit 38 and are used to calculate corrected pseudo range values at output 60. The corrected pseudo range values can be used for various positioning, targeting and navigation calculations and operations as is well known in the art.

Preferably, deterministic correction circuit 38 includes an ionospheric correction circuit 48 which provides ionospheric corrections to the raw pseudo range values at output 58. In one embodiment, ionospheric correction circuit 48 provides corrections according to the ionospheric correction equation given in the background of the invention of the present application. Alternatively, other algorithms and equations can be utilized to make ionospheric corrections. This includes, but is not limited to, preloading the receiver with ionospheric corrections.

In addition, ionospheric correction circuit 48 receives an indication of a first delay error (for L1) at output 54 and a second delay error (for L2) at output 52. Preferably, the raw pseudo range data includes a value for $e\vec{r}$ and row $e\vec{r}$. Ionospheric correction circuit utilizes the indication of the delay errors from filter 36 to adjust the raw pseudo range data so that appropriate ionospheric corrections are made to form the corrected pseudo range data at output 60.

Positioning receiver 26 preferably includes a filter 36. Filter 36 utilizes the serial data provided at output 44 to generate the first delay error estimate at output 54 and the second delay error estimate at output 52. Filter 36 is a digital filter implemented in software executed on a digital signal processor (DSP). Circuit 48 preferably utilizes the delay error estimates to correct the pseudorange measurements supplied over interface 58.

Filter 36 receives the delay error at conductor 44 and provides a filtered version of the delay error estimate at output 54 to ionospheric correction circuit 48. In addition, filter 36 can be configured to provide an estimate of the first derivative of the delay error estimate so that extrapolated estimates of the delay error can be utilized by ionospheric corrections circuit 48. If the update rate of the delay error estimates is slow relative to the GPS processing rate or if the rates are asynchronous and the dynamics are significant, the last known delay error estimate can be extrapolated to the current time needed for GPS using the first derivative. The delay error estimate is then the latest delay error plus the first derivative multiplied by the time difference between the validity time of the error and the current GPS processing time.

In one embodiment ionospheric corrections circuit 48 adjust the raw PR values in accordance with delay error 1 and delay error 2 to achieve L1 and L2 values corrected for digital anti-jamming processing. These corrected L1 and L2 values are used to make ionospheric corrections according to the equation given in the background of the invention. In another embodiment, the calculation for ionospheric corrections can be adjusted in accordance with the delay errors provided at outputs 52 and 54. In either embodiment, ionospheric corrections circuit 48 provides corrected L1 and L2 values in response to delays or distortions associated with digital anti-jamming processing circuit 24. Ionospheric corrections circuit 48 can be implemented in software executed on a digital signal processor, on an ASIC, or other hardware. Alternatively, ionospheric corrections 48 can be implemented in a hardware circuit without the use of software.

Digital antijamming processing circuit 24 can be implemented in a variety of circuitry including dedicated hardwired circuits, application specific integrated circuits, programmable logic, digital signal processors, etc. In one embodiment, digital antijamming processing circuit is a conventional space time adapted processing circuit (STAP) or space frequency adapted processing circuit (SFAP). The digital anti-jamming processing circuit 24 can apply an algorithm utilizing a covariance matrix to remove jamming signals. Alternatively, digital anti-jamming processing circuit 24 can be configured utilizing a fast fourier transform (FFT). In yet another alternative, a beam former utilizing time or space frequency techniques can be utilized.

Distortion calculator 30 determines the distortion provided by anti-jamming processing circuit 24 in the form of a delay. Distortion calculator 30 provides a message, preferably a serial message, indicating the delay error at a particular time. The delay error is measured by calculating the effective anti-jam filter response in the direction of the desired satellite. The group delay of this filter manifests itself as pseudorange error, so by calculating the group delay, one is able to determine the corrections to pseudorange error that are utilized in the iono corrections.

Figure 2:
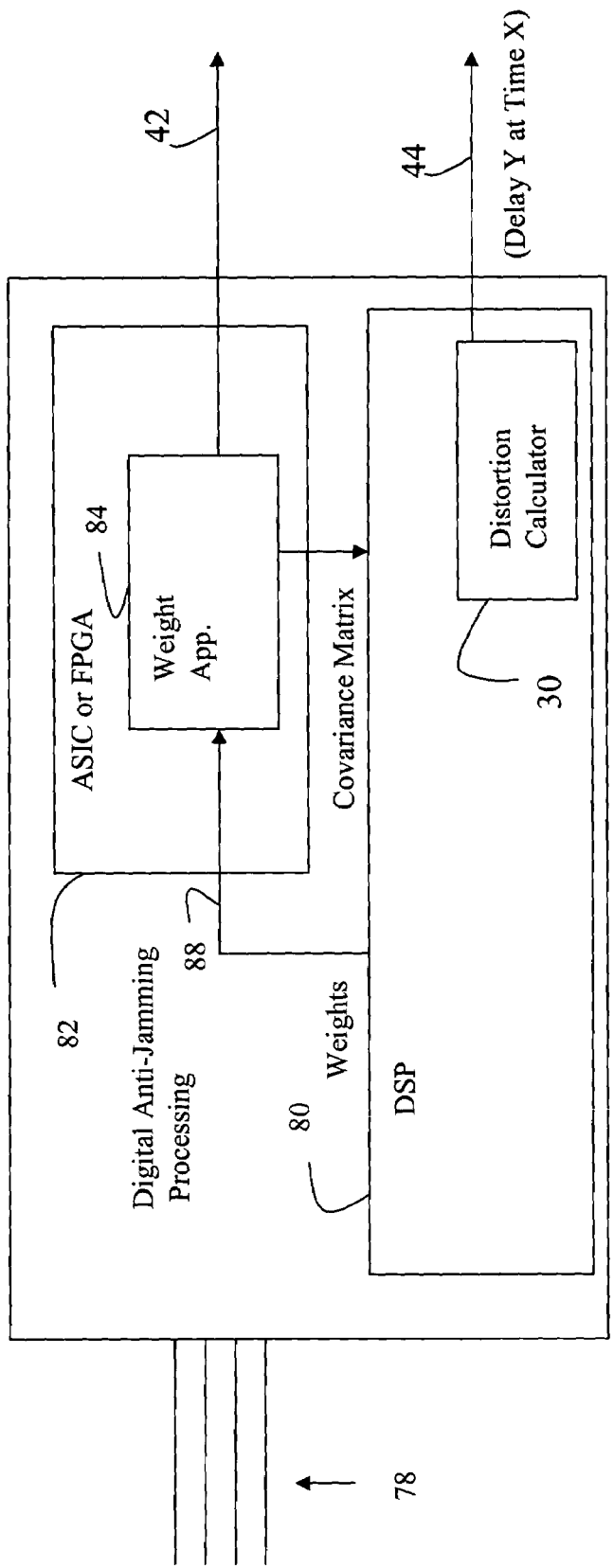
FIG. 2 is a more detailed general block diagram of the anti-jamming circuit illustrated in FIG. 1 in accordance with still another exemplary embodiment.

With reference to FIG. 2, digital anti-jamming processing circuit 24 is configured including an ASIC 82 and distortion calculator 30 implemented in a DSP 80. Digital anti-jamming processing circuit 24 receives signals at inputs 78 and provides them through weight application circuit 84 in ASIC 82. Weight application circuit 84 preferably receives weight values from DSP 80 in accordance with a digital anti-jamming processing algorithm. The weight values are provided at an input 88 to weight application circuit 84. Weight application circuit 84 compensates for jamming energy to provide signals to GPS engine 34 (FIG. 1).

Distortion calculator 30 analyzes the weight values provided through weight application circuit 84 to calculate the delay for output 44.

For a STAP anti-jam system, the digital data from each channel is filtered by an FIR filter whose coefficients are the adaptive weights. The filtered outputs from each channel are summed to form a single signal stream. The summed FIR filter outputs, with each filter weighted by a complex number that is a function of satellite direction, is the effective spatial filter for a given satellite. The group delay calculated from this effective filter is the delay error imparted by the anti-jam processing on the GPS signal.

Distortion calculator 30 can be implemented as a software module operating on DSP 80. Further, filter 36 (FIG. 1) can be a software and/or hardware circuit. The specific implementation of the features and functions described above are not disclosed in a limiting fashion.

In one preferred embodiment, digital anti-jamming processing circuit 24 is a beamformer that supplies corrections via distortion calculator 30 to filter 36. The corrections are provided for each line of site to the raw pseudo range values used in ionospheric corrections circuit 48. By using filter 36, the first derivative of the corrections can be generated. In such an embodiment, filter 36 can be similar to an alpha-beta tracker (commonly used in engineering to track a parameter and its first derivative) or to a two state Kalman filter used for ionospheric corrections. By utilizing beamformer supplied corrections in the calculation of ionospheric corrections, the beamformer induced error is reduced significantly. If the errors after beamformer corrections on L1 and L2 signals are XX=(X–X') and (YY=Y–Y'), respectively, the error can be represented by replacing X by XX and Y by YY in paragraphs 1 and 2 discussed in the background of the invention. By estimating the rate of change of the beamformer correction, the error in compensation can be reduced when ionospheric corrections are measured during periods of jammer motion or significant platform dynamics (e.g., a pitch, roll or yaw) that cause STAP antenna pattern gradients.

It is understood that while the detailed drawings, specific examples and particular values given provide preferred exemplary embodiments of the present invention, they are for the purpose of illustration only. The exact hardware and equations described are not disclosed in a limiting fashion. The method and apparatus of the invention is not limited to the precise details and conditions disclosed. Various changes may be made to the details disclosed about departing from the spirit of the invention which is defined by the following claims.

What is claimed is:

1. A method of compensating for delays induced by anti-jamming processing, the method comprising:
   determining a delay error associated with the anti-jamming processing; and
   adjusting ionospheric corrections in response to the delay error.

2. The method of claim 1, wherein the delay is calculated in a distortion calculator associated with a digital anti-jamming processing circuit.

3. The method of claim 2, wherein a distortion calculator determines the delay error in response to weight values utilized by the digital anti-jamming processing circuit.

4. The method of claim 2, wherein the delay error is provided as serial data from the anti-jamming processing circuit.

5. The method of claim 4, wherein the serial data indicates a delay error parameter at a specific time period.

6. The method of claim 1, wherein the delay error parameter is utilized to adjust raw pseudo range values before ionospheric corrections are made.

7. The method of claim 3, wherein the distortion calculator is implemented in a digital signal processor.

8. The method of claim 1, wherein a derivative of the delay error is used to adjust the ionospheric corrections.

9. A positioning system including an anti-jamming processing circuit, the positioning system comprises;
   a distortion calculator for calculating a delay error associated with the digital anti-jamming processing circuit; and
   an ionospheric correction circuit for providing ionospheric corrections for pseudo range values derived from data provided by the digital anti-jamming processing circuit, wherein the ionospheric corrections circuit calculates the ionospheric corrections in response to the delay error to reduce errors induced from the digital anti-jamming processing circuit.

10. The system of claim 9, where in the digital anti-jamming processing circuit is implemented in an application specific integrated circuit.

11. The system of claim 10, wherein the digital anti-jamming processing circuit includes a digital signal processor for implementing the distortion calculator and the application specific integrated circuit includes a weight application circuit.

12. The system of claim 9, wherein the ionospheric correction circuit receives raw pseudo ranges and adjusts the raw pseudo ranges in accordance with the delay error before creating corrected pseudo range values.

13. The system of claim 9, wherein the ionospheric correction circuit is included in a GPS receiver.

14. The system of claim 9, wherein the delay error is provided as serial data.

15. The system of claim 9, wherein the digital anti-jamming processing circuit is a space time adaptive processing circuit or space frequency adaptive processing circuit.

16. An apparatus for removing anti-jamming induced errors from ionospheric corrections, the apparatus comprising:
   means for determining a delay error associated with anti-jamming processing; and
   means for calculating ionospheric corrections, the means for calculating ionospheric corrections either receiving pseudo range values adjusted by the delay error or calculates the ionospheric corrections in accordance with the delay error.

17. The apparatus of claim 16, wherein the means for determining a delay error is a digital signal processor.

18. The apparatus of claim 17, wherein when the pseudo range values are associated with a GPS.

19. The apparatus of claim 17, wherein the anti-jamming processing utilizes abeam forming algorithm.

20. The apparatus of claim 19, wherein the beam forming algorithm utilizes space time adaptive processing and/or space frequency adaptive processing.

* * * * *